Feb. 24, 1931.  A. N. CALKINS  1,793,774

BRAKE

Filed Feb. 4, 1928  2 Sheets-Sheet 1

Inventor:
Addison N. Calkins.
By Lindahl, Parker & Carlson
Attys.

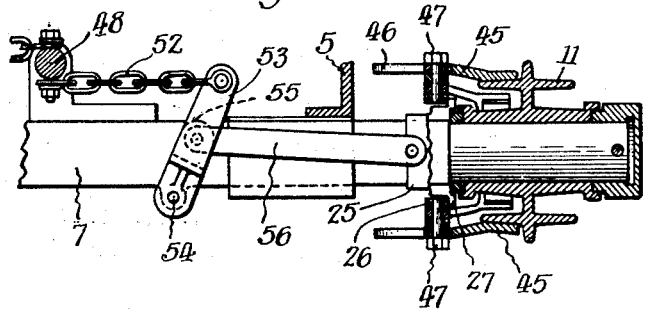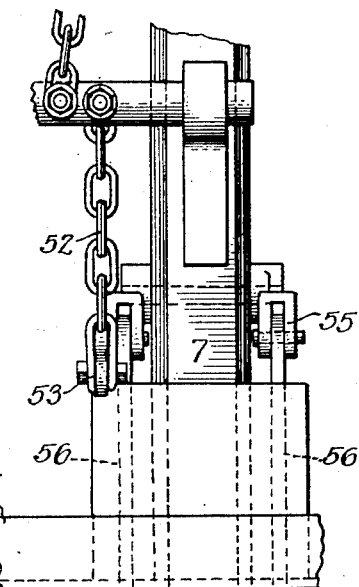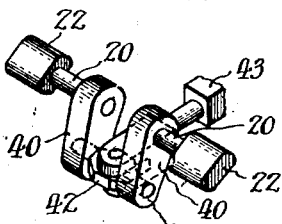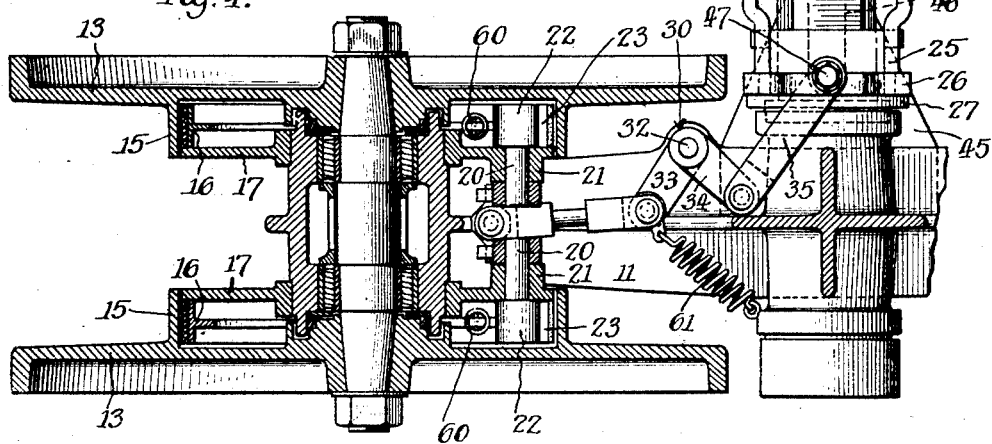

Patented Feb. 24, 1931

1,793,774

UNITED STATES PATENT OFFICE

ADDISON N. CALKINS, OF QUINCY, ILLINOIS, ASSIGNOR TO ELECTRIC WHEEL COMPANY, OF QUINCY, ILLINOIS, A CORPORATION OF ILLINOIS

BRAKE

Application filed February 4, 1923. Serial No. 251,801.

The invention relates generally to brakes and more particularly to a brake for vehicles of the crawler or endless belt type. In order that the effectiveness of such a brake may be commensurate with the loads usually carried by crawler type vehicles, the brake must be applied to the crawler units which have a relatively large area in engagement with the ground, and it is the primary object of the present invention to provide such a brake which is uniformly operative in any of the positions of the crawler unit which may be caused by surface irregularities over which the vehicle may travel.

Another object is to provide a brake for the belt-supporting wheel of such a vehicle which is operable by a force acting longitudinally of the axle which supports the crawler unit.

A further object is to provide a braking device for a crawler unit having a separate wheel supporting each side of the track, a brake being provided for each of a pair of wheels and means for simultaneously operating the two brakes in such a manner as to avoid unequal stresses upon the two wheels.

Other objects and advantages will become apparent from the following description and the accompanying drawings, in which:

Fig. 3 is a fragmental elevational view of the axle and the brake operating parts associated therewith.

Fig. 4 is a fragmental plan view of the axle shown in Fig. 3, the belt-supporting wheels being shown in section.

Fig. 5 is a perspective of a part of the brake operating means.

Figure 1:
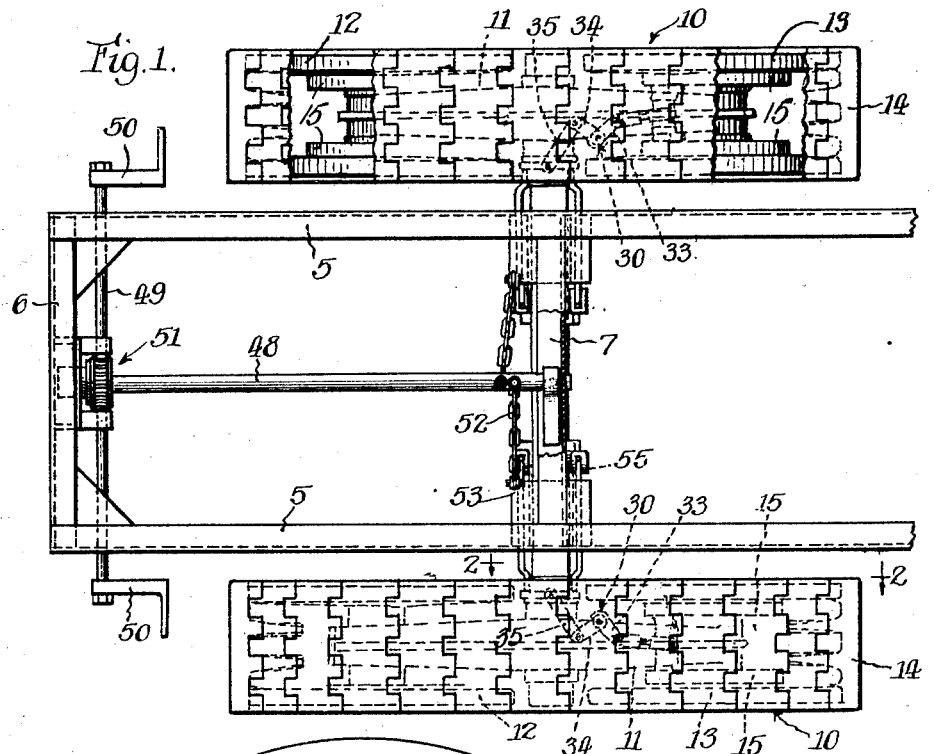
Figure 1 is a plan view of a crawler type vehicle embodying the preferred form of the present invention.

While the invention is susceptible of various modifications and alternative constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In the drawings the invention is shown as applied to a trailer vehicle equipped with crawler units. The vehicle illustrated has a main frame composed of side rails 5 and end members 6. An axle 7 is stationarily secured beneath the frame and projects beyond the side rails 5 to receive suitable crawler units designated generally as 10 (Fig. 1) which are pivotally mounted on the axle so that the position of crawler units may be varied by the contour of the ground without transmitting the entire movement to the frame.

The crawler units 10 are similar in character, each comprising, in general, a frame or beam 11, two pairs of wheels 12 and 13 mounted at opposite ends of the beam, and an endless belt 14 mounted on and guided by the wheels, the beam 11 being pivotally mounted on the axle 7, all in a well known manner.

Braking means is provided for stopping or controlling the rotation of the pair of wheels 13 of each crawler unit 10. As herein illustrated, an inwardly extending brake drum 15 is formed on the inner side of each of said wheels 13 and a pair of expansible brake shoes 16 are positioned within each brake drum. A closure plate 17 is mounted on each side of the beam 11 so as to completely close the open end of the brake drum 15 and thus protect the braking elements from dust and dirt. Alined stub shafts 20 are rotatably mounted in bosses 21 formed in the closure plates 17 and cam blocks 22 are secured thereon between the flanged ends 23 of the brake shoes 16 so that the brake shoes may be expanded by rotation of the shafts 20.

The means provided for applying the brakes is preferably of such a character that it is unaffected by the rotative movement of the crawler units relative to the frame and hence operable uniformly to apply the brake regardless of the position of the units.

Figure 2:
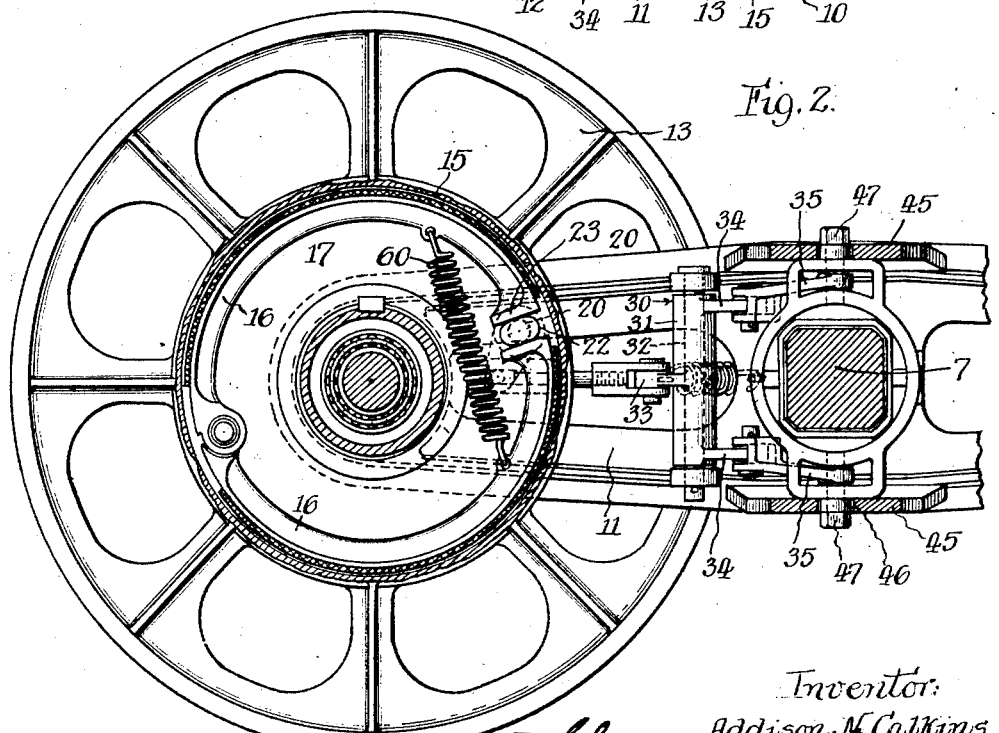
Fig. 2 is a fragmental elevational view of one of the crawler units as viewed from the line 2—2 of Fig. 1, part of the adjacent wheel being broken away to disclose the interior of the brake drum.

In the present instance this means includes two relatively rotatable members 25 and 26 mounted about the axles 7 and associated in such a manner that movement of one of the members longitudinally of the axle 7 will be transmitted to the other member. The member 25 is herein shown as a sleeve (Figs. 2, 3 and 4) non-rotatably mounted on the axle 7 adjacent the inner side of the crawler unit 10 and arranged to slide longitudinally of the axle away from the unit (to the left in Fig. 3). The member 26 is in the form of a collar which loosely surrounds the sleeve 25 and is arranged to be moved with the sleeve 25 longitudinally of the axle away from the crawler unit 10 by a flange 27 formed on the sleeve 25.

The operative connection between the braking means and the collar 26 is such as to transmit and change the direction of the forces so that the brake may be applied by moving the collar 26 along the axle away from the crawler unit. This means preferably includes, in each instance, a bell crank 30 which serves to change the direction of the forces. The bell crank 30 as herein shown comprises a sleeve 31 rotatably mounted on a vertical stub shaft 32 which is secured in the beam 11, an arm 33 extending from the sleeve near the center thereof and two arms 34 extending one from the top of the sleeve and one from the bottom at an angle to the arm 33. The arms 34 are connected to the top and bottom respectively of the collar 26 by means of links 35, the ends of the links being pivotally secured to the arms 34 and the collar 26. The arm 33 is connected to the braking means in a manner which will now be described.

As shown most clearly in Fig. 5, a lever 40 is secured to the inner end of each of the shafts 20 so as to extend downwardly from the shafts. An aperture 41 is formed in the lower end of each lever so as to receive the ends of an equalizing bar 42 which extends between the two levers. An adjustable link 43 is pivotally secured at its opposite ends to the arm 33 of the bell crank and the middle of the bar 42. Thus an equalizing connection is provided which serves to equally retard the two wheels so as to avoid undue strain upon either of the wheels.

In order that the collar 26 may be caused to rock about the axle 7 with the crawler unit 10, a pair of plates 45 are secured to the top and bottom respectively of the beam 11 so as to extend inwardly therefrom, and guide slots 46 are formed therein to receive the ends of bolts 47 which are secured to the collar 26 and which also serve as pivots for the links 35.

Means is preferably provided for simultaneously moving the sleeves 25 on the two sides of the vehicle so as to apply the brakes to both crawler units 10. As herein shown this means comprises a longitudinal shaft 48 rotatably mounted at its opposite ends on the end member 6 of the frame and on the axle 7. For the purpose of rotating the shaft 48, a shaft 49 (Fig. 1) having crank handles 50 thereon, is rotatably mounted transversely of the frame and geared to the shaft by means such as a worm and worm wheel 51. The rotation of the shaft 48 is arranged to move the sleeves 25 through the medium of chains 52 which are each secured at one end to the shaft 48 so as to wrap about the shaft while at the other end each is secured to the free end of a lever 53 which is fixed on one end of a stub shaft 54 (Fig. 3). The stub shaft 54 is rotatably mounted transversely of the axle 7 and has a short lever 55 secured to its other end. The levers 53 and 55 are connected to the sleeve 25 by means of links 56 so that when the shaft 48 is rotated so as to shorten the chains 52, the sleeves 25 will be drawn toward the middle of the axle so as to apply the brakes.

Means is preferably provided to restore the parts to their normal brake released position when the chains 52 are unwound from the shaft. As herein shown a retractile spring 60 is connected to the free ends of the brake shoes 16 so as to oppose the expansion thereof and thus when the cam 22 is returned to its inoperative position, the brake shoes 16 will be drawn together and out of contact with the drum 15. For the purpose of returning the cam 22, the bell crank 30, the collar 26 and sleeve 25 to normal brake releasing position after the chains 52 have been loosened, a spring 61 (Fig. 4) is connected to the beam 11 and the arm 33 of the bell crank 30 so that the spring will oppose the movement of these parts in setting the brake.

In the operation of the device braking force is applied to both of the crawler units by means of the handles 50 which serve to rotate the shaft 48 extending longitudinally of the main frame. Rotation of the shaft 48 serves through the medium of the flexible connection 52, the levers 53 and the links 56 to move the two members 25 longitudinally of the axle 7 inwardly toward the main frame. The movement of the members 25 is transmitted to the brake operating connections mounted on the crawler frames by means of the links 35, one end of each link being guided by the slot in the plate 45 for movement along a definite path in fixed relation to the crawler frames by the bolt 47 which engages the member 25 so as to be moved by the member 25 and arranged to permit relative rotative movement of the crawler unit and the axle.

The other end of each link 35 is connected to an arm of a bell crank mounted on the crawler frame so that when the links are drawn inwardly of the axle the bell cranks are rocked. The other arm of each bell crank is connected through a link through the equalizing bar and since the two ends of the equalizing bar are connected to the two cams of the two opposite brakes, these two brakes are applied with an equal pressure. When the handles 50 are actuated to release the brake, the springs 60 and 61 serve to return the various parts to their inoperative position.

From the foregoing description it will be apparent that the invention provides a brake for crawler type vehicles which is uniformly operative to apply the brake irrespective of the position of the crawler units thereof. It will also be apparent that the invention provides a brake which will not subject the parts of the crawler unit to unequal stresses which would tend to distort or break such parts.

I claim as my invention:

1. The combination with a crawler type vehicle having a main frame, an axle, a side frame rotatably mounted on said axle, a pair of wheels rotatably and coaxially mounted on each end of said side frame, and an endless belt on said wheels; of means for applying braking force to one pair of said wheels comprising a pair of brake drums, one on each wheel, a pair of braking elements mounted on each side frame, one of said elements arranged to engage each of said drums, a pair of levers, one arranged to operate each of said braking elements to cause such engagement, an equalizing bar connected at opposite ends to said levers, a member longitudinally movable with respect to said axle and arranged to rock with said side frame, means on the axle movable longitudinally thereof and arranged to move said member therewith, and means connecting said member and said equalizing bar operable to transmit the motion of said member to said bar to apply said brakes.

2. The combination with a crawler type vehicle having a main frame, an axle secured thereto, a side frame pivotally supported on said axle, wheels rotatably mounted on said side frame, and an endless belt on said wheels, of braking means for said vehicle comprising a brake drum on one of said wheels, a braking element operable to engage said drum to control the rotation of said wheel, a member longitudinally movable with respect to said axle and arranged to rotate about said axle with said side frame, means on the axle movable longitudinally thereof and arranged to engage said member to move said member therewith, and means connecting said member and said braking element operable upon movement of said member to engage said braking element with said drum.

3. The combination with a crawler type vehicle having a main frame, an axle, a side frame pivotally supported on said axle, wheels rotatably mounted on said side frame, and an endless belt on said wheels, of a brake for said vehicle comprising a brake drum on one of said wheels, a braking element operable to engage said drum to control the rotation of said wheel, a member mounted on said axle for longitudinal movement thereon and arranged to rotate about said axle with said side frame, means connecting said member and said braking element operable upon movement of said member along said axle to engage said braking element with said drum, and means fixed on said axle against rotation relative thereto but movable longitudinally thereon to engage and move said member irrespective of its position on said axle.

4. A brake device for a crawler type vehicle having a main frame, an axle, and a crawler unit mounted on said axle for rotation thereabout, said device comprising braking means on said crawler unit operable to control operation of said unit, a member mounted on said axle for axial movement thereon and rotatable about said axle with said crawler unit, means connecting said member and said braking means arranged to operate said braking means when said member is moved longitudinally of said axle, and a part mounted for longitudinal movement but against rotative movement relative to said axle and arranged to engage said member in any of its positions to transmit longitudinal movement thereto.

5. A brake device for a crawler type vehicle having an axle and a crawler unit pivotally mounted thereon, said device comprising braking means operable to control or stop the normal operation of said crawler unit, operating means for said braking means including a part mounted for rotation with said unit about said axle and longitudinally slidable along said axle to operate said brake, a member slidably mounted on said axle to transmit longitudinal motion to said part, and means operable to move said member along said axle whereby said brake may be operated.

6. A vehicle comprising, in combination, a main frame, crawler units pivoted on and supporting said frame, each of said units including an endless belt and guide wheels therefor, braking means operable to apply braking force to one of said wheels and having one friction element of said means mounted on said wheel, operating means for said braking means mounted on said main frame and means operatively connecting said operating means to said braking means arranged when said operating means is actuated in a given amount to apply said braking means to the same degree irrespective of the relative angular relation of said crawler unit and said frame.

7. In a vehicle having a main frame, an axle, and a pair of crawler units, one rockably secured on each end of said axle, the combination of braking means for each of said crawler units, and means for applying said brakes operable from said main frame. said brakes and the applying means being arranged to be unaffected by the rocking movement of said crawler units relative to said frame.

8. A brake device for a crawler type vehicle having a main frame with an axle and a crawler unit pivotally mounted thereon, said device comprising braking means operable to control or stop the normal operation of said crawler unit, and operating means for said braking means including a member mounted for rotation with said unit and slidable on said unit longitudinally with respect to said axle to operate said brake, a second member mounted on said main frame for sliding movement longitudinally with respect to said axle, said members having a uniform operative engagement in all angular positions of said crawler unit relatively to said main frame, and means on said main frame operable to move said second member whereby to operate said brake.

In testimony whereof, I have hereunto affixed my signature.

ADDISON N. CALKINS.